United States Patent [19]
Sun

[11] Patent Number: 6,006,471
[45] Date of Patent: Dec. 28, 1999

[54] AIR-CLEANING ECOSYSTEM APPARATUS

[76] Inventor: En-Jang Sun, 4F, 167, Ler-Yeh St., Taipei (106), Taiwan

[21] Appl. No.: 09/076,036

[22] Filed: May 7, 1998

[51] Int. Cl.⁶ .............................. A01G 9/18; A01G 9/24; A01G 31/00; A01K 63/00
[52] U.S. Cl. .................................. 47/69; 47/79; 47/48.5; 47/62 A; 47/59; 119/246; 119/247
[58] Field of Search .................. 47/1.01 F, 69, 47/79, 48.5, 62 A, 65, 59, 17, 60; 119/246, 452, 247

[56] References Cited

U.S. PATENT DOCUMENTS

| | | | |
|---|---|---|---|
| 293,577 | 2/1884 | Howe | 239/209 |
| 2,300,776 | 11/1942 | Collins | 47/69 |
| 2,709,838 | 6/1955 | Zausner | 47/17 |
| 3,380,190 | 4/1968 | Granger | 47/58.1 |
| 3,529,379 | 9/1970 | Ware | 47/17 |
| 4,567,732 | 2/1986 | Landstrom et al. | 62/91 |
| 4,787,336 | 11/1988 | Lineberry | 119/5 |
| 4,884,366 | 12/1989 | Morton | 47/62 |
| 5,209,015 | 5/1993 | De Filippi | 47/79 |
| 5,283,974 | 2/1994 | Graf, Jr. | 47/60 |
| 5,299,383 | 4/1994 | Takakura et al. | 47/58 |
| 5,315,834 | 5/1994 | Garunts et al. | 62/78 |
| 5,771,841 | 6/1998 | Boor | 119/452 |
| 5,799,614 | 9/1998 | Greenwood | 119/452 |

*Primary Examiner*—Michael J. Carone
*Assistant Examiner*—Son T. Nguyen

[57] ABSTRACT

An air-cleaning ecosystem apparatus includes: an ecosystem container having green plants, pollutant-absorbable plants and aromatic plants selectively planted in the ecosystem container; at least an illuminator installed in the ecosystem container; a blower having filters connected to the ecosystem container for delivering input air as primarily filtered into the ecosystem container; and an irrigation device for delivering water into the container for watering the plants; whereby upon light exposure by the illuminator, the green plants will conduct photosynthesis for absorbing carbon dioxide from the air and giving off oxygen into the air; the pollutant-absorbable plants will absorb some pollutants existing in the air; and the aromatic plants will release fragrant smell into the air, thereby outputting clean, fragrant air rich in oxygen beneficial for human and animal breathing for completing a gaseous cycle of ecosystem.

5 Claims, 2 Drawing Sheets

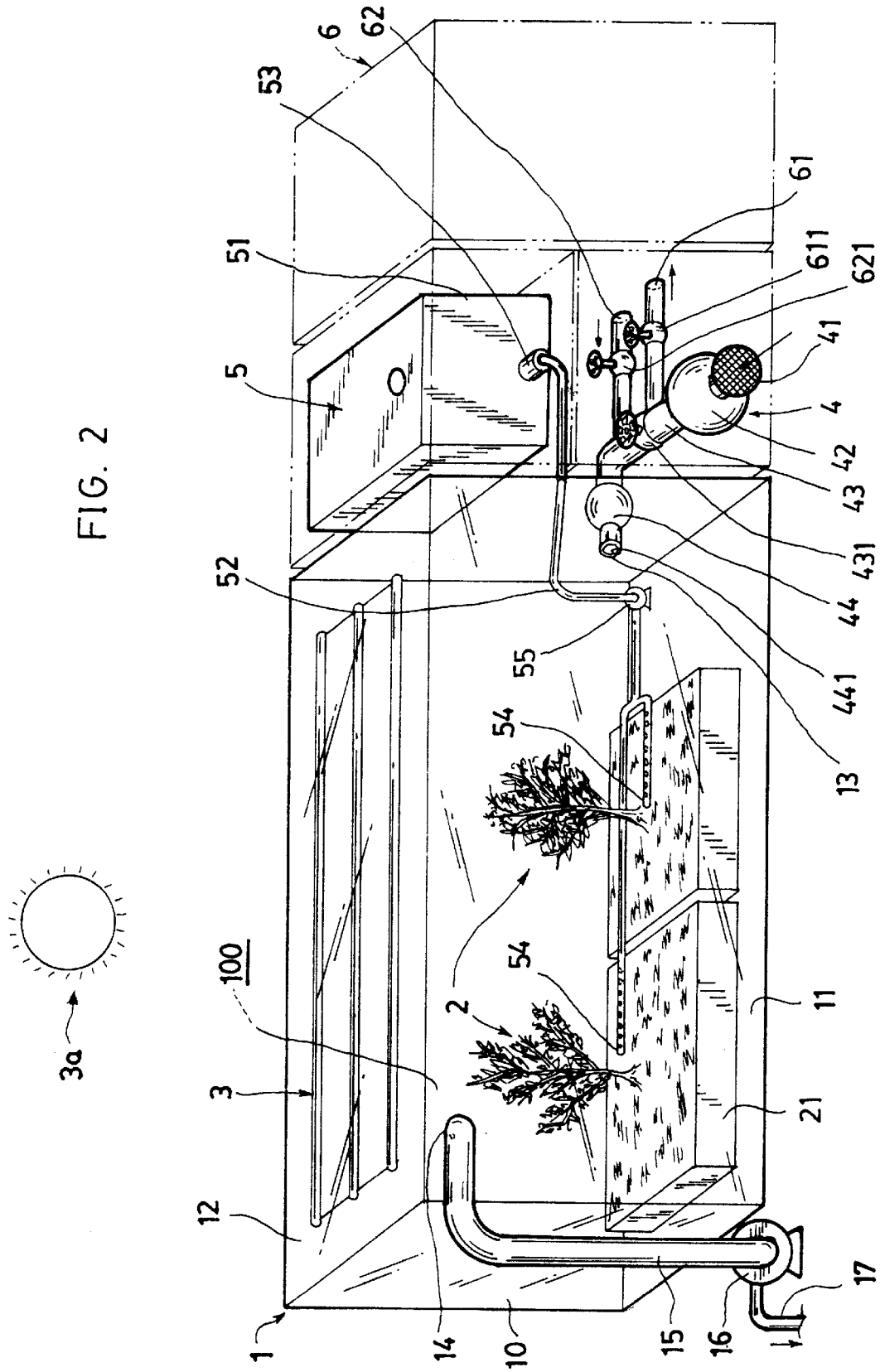

AIR-CLEANING ECOSYSTEM APPARATUS

BACKGROUND OF THE INVENTION

For cleaning up the air, a variety of facilities may be provided to remove the pollutants laden or existing in the air. The gaseous waste products from aerobic respiration or combustion of fuels can be removed by scrubber and absorber. For instance, the carbon dioxide can be absorbed in monoethanolamine in an absorber tower. However, the conventional air cleaning equipment or systems are expensive in cost for the installation, operation and maintenance, thereby limiting their wide applications especially in city houses or buildings. Meanwhile, the conventional air cleaning equipment may only remove the air pollutants, but not able to provide fresh air rich in oxygen which is beneficial for human or animal breathing.

The present inventor has found the drawbacks of the conventional air cleaning equipment and invented the present air-cleaning ecosystem apparatus.

SUMMARY OF THE INVENTION

The object of the present invention is to provide an air-cleaning ecosystem apparatus including: an ecosystem container having green plants, pollutant-absorbable plants and aromatic plants selectively planted in the ecosystem container; at least an illuminator installed in the ecosystem container; a blower having filters connected to the ecosystem container for delivering input air as primarily filtered into the ecosystem container; and an irrigation device for delivering water into the container for watering the plants; whereby upon light exposure by the illuminator, the green plants will conduct photosynthesis for absorbing carbon dioxide from the air and giving off oxygen into the air; the pollutant-absorbable plants will absorb some pollutants existing in the air; and the aromatic plants will release fragrant smell into the air, thereby outputting clean, fragrant air rich in oxygen beneficial for human and animal breathing for completing a gaseous cycle of ecosystem.

BRIEF DESCRIPTION OF THE DRAWINGS

FIG. 2 shows another preferred embodiment of the present invention.

DETAILED DESCRIPTION

Figure 1:
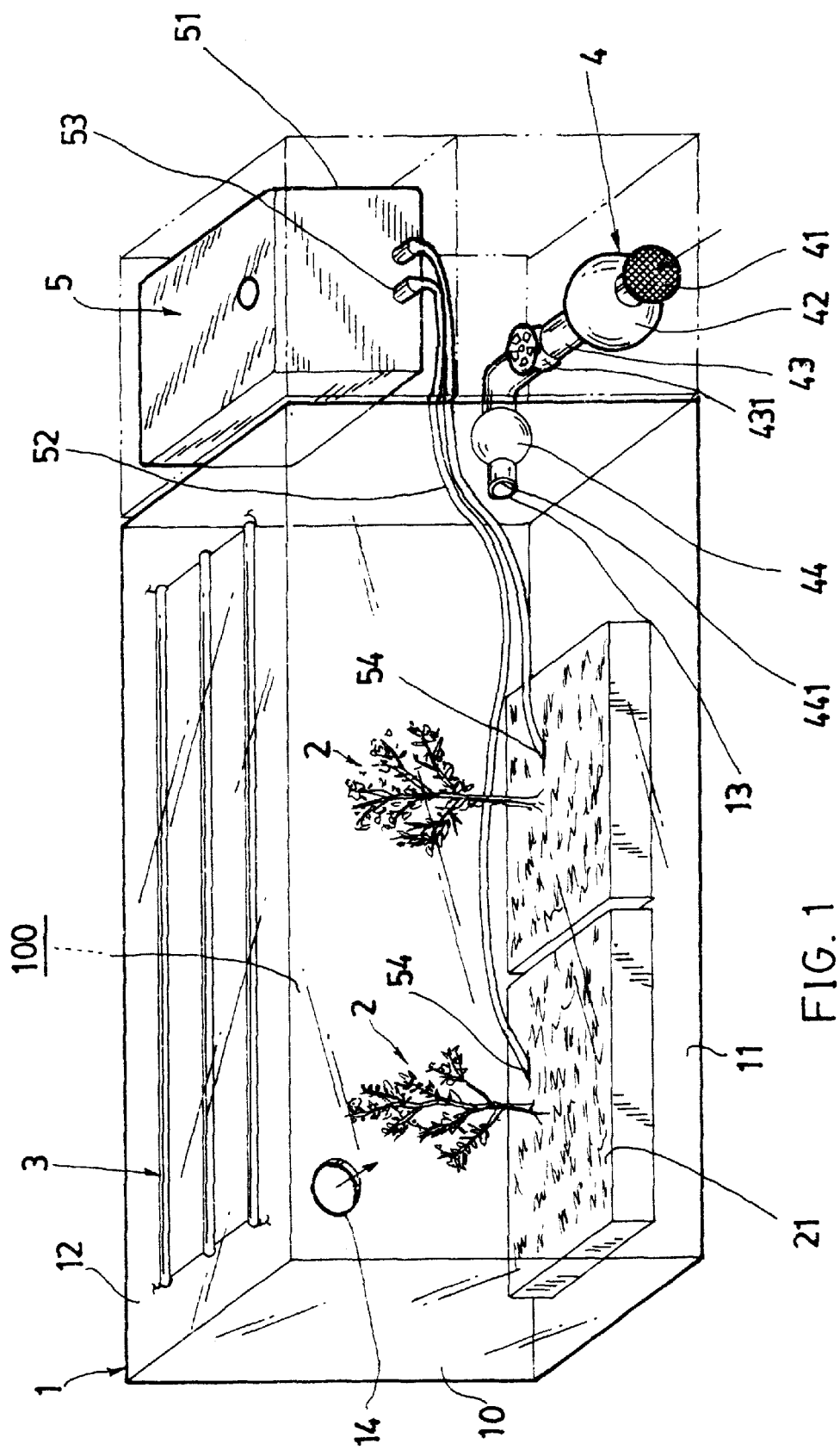
FIG. 1 shows an ecosystem apparatus in accordance with the present invention.

As shown in FIG. 1, the air-cleaning ecosystem apparatus of the present invention comprises: an ecosystem container 1; a plurality of plants 2 planted in the ecosystem container 1; at least an illuminator 3 (or a plurality of illuminators 3) installed in the ecosystem container 1; a primary air treatment means 4 connected to an inlet port 13 of the ecosystem container 1 for primarily filtering the pollutants laden or existing in input air and an irrigation means 5 connected with the ecosystem container 1 for delivering water into the container 1 for watering the plants 2 as planted in the container 1.

The illuminator 3 may be a fluorescent lamp, incandescent bulb, or other lamps, or even a solar light 3a (FIG. 2), not limited in the present invention.

The ecosystem container 1 may be made of transparent materials or other materials. Even though the container 1 as shown in the drawing figure is formed as a parallelepiped, other shapes or structures of the container 1 may be made in the present invention without being limited.

The ecosystem container 1 includes: an ecosystem chamber 100 defined among a bottom 11, a roof 12 and at least a side wall 10 forming the container; an inlet port 13 formed in a first side portion (preferably at a lower location) of the container 1; and an outlet port 14 formed in a second side portion (preferably at a high location) of the container 1 opposite to the inlet port 13. Naturally, the container may also be opened for a large area on the wall for displaying the plants.

The irrigation means 5 includes: a water tank 51 secured on an upper portion of the container 1 or installed on a frame above the bottom 11 of the container 1 to get a suitable height or head for gravitationally or capillarily draining water into the container 1 for watering the plants 2, a plurality of irrigation tubes (or pipes) 52 each tube 52 having an input end connected with a water filter 53 submerged or fixed in the water tank 51 for filtering dirt contained in the water, and a perforated tube portion 54 led to the plants 2 for watering the plants 2.

The irrigation means 5 may be a drip irrigation piping system or other suitable irrigation systems. The irrigation means 5 may also be omitted and the plants 2 will then be watered manually.

The plants 2 as planted in the ecosystem container 1 includes: green plants which will absorb carbon dioxide from the input air entering the container 1 through the inlet port 13 of the container 1 to conduct photosynthesis under light exposure of the illuminator 3 to convert the carbon in carbon dioxide into carbon in complex organic compounds such as glucose by the action of chlorophyll in the green leaves of the green plants and to give off oxygen (produced in the photosynthesis process) into the output air as discharged from the outlet port of the container to be inhaled by human being and animals for their aerobic respiration for completing the gaseous cycle of ecosystem; pollutant-absorbable plants absorbing gaseous or vaporous pollutants existing in the input air; and aromatic plants releasing fragrant smell outwardly into the output air.

Naturally, the above-mentioned pollutant-absorbable plants and aromatic plants are also able to conduct photosynthesis to absorb carbon dioxide and to produce oxygen during the photosynthesis process.

The pollutant-absorbable plants includes: Begonia (*begonia semperflorens*) for absorbing sulfur dioxide and ozone existing in the input air; water spinach (*Ipomaea aquatica*) for absorbing nitrogen dioxide and ozone existing in the input air; and other suitable plants.

The aromatic plant includes: night jasmine (*cestrum nocturnum*) for emitting flower fragrant smell; Basil (*Ocimum basilicum*) for emitting perfuming smell; and other suitable plants for releasing fragrant smell into the output air.

The plants 2 may be planted on plant boxes, pots, disks or plates having soil 21 stored therein; or just planted on a bottom layer of soil 21 paved on a the bottom 11 in the container 1.

The primary air treatment means 4 includes: a blower 42 fixed on an input pipe 43, a suction filter 41 secured at a front suction end of the blower 42 for filtering particulate pollutants, dust or dirt laden in input air as inwardly sucked by the blower, a deodorizing filter 44 formed on the input pipe 43 and having a filter outlet 441 connected with the inlet port 13 of the container 1 for deodorizing the input air as blown by the blower 42 and a control valve 431 formed on the input pipe 43 for controlling a volumetric flow rate of the input air as delivered through the blower 42 and the input pipe 43 into the container.

The suction filter 41 is formed with fibers, non-woven cloth, air permeable porous foam and other suitable filtering materials for filtering particulate dirt, dusts or pollutants laden in the air.

The deodorizing filter 44 is formed with activated carbon or other deodorizing materials for absorbing or removing stinking smell or odor existing in the input air.

If the input air contains more pollutants either solid or gaseous, vaporous or mist contaminants, an auxiliary air cleaning means 6 may be further provided as shown in FIG. 2 for further cleaning the input air. The auxiliary air cleaning means 6 may be selected from the group of: a static electroprecipitator, an absorber, a bag filter, and other air cleaning equipment. For instance, if the present invention is installed in a community near a fertilizer plant having heavy emission of ammonia waste gas, the auxiliary air cleaning means 6 of the present invention may then be added with a water scrubber for washing, absorbing and removing the ammonia in the input air.

The present invention may be placed in a room, a house, an office, a building, a basement and any other places for cleaning indoor air to suck air from the environment to be primarily filtered or cleaned by the primary air treatment means 4 and then input into the ecosystem chamber 100 in the container 1 to allow the plants 2 planted in the container to absorb the carbon dioxide and other pollutants existing in the input air, whereby the "treated air" having pollutants removed and having oxygen released from the plants into the air will be discharged outwardly through the outlet port 14 to be breathed by people living in the room or at a place provided with the apparatus of the present invention.

For treating input air with increased volume as shown in FIG. 2, the present invention may also be installed on a roofing floor of a multiple-story building or on a ground with larger area to allow the solar light 3a to photosynthesize the plants 2 planted in the container 1 made of transparent material. The input air may be further cleaned by the auxiliary air cleaning means 6 by closing the control valve 431 on the input pipe 43 and by opening an inlet valve 611 formed on an inlet pipe 61 and opening an outlet valve 621 formed on an outlet pipe 62; both pipes 61, 62 bypassed from the control valve 431 of the input pipe 43 and connected with the auxiliary air cleaning means 6 for by-passing the input air to be further treated and cleaned in the auxiliary air cleaning means 6. Then the primarily treated input air is directed into the inlet port 13 of the container to conduct the gaseous cycle of the ecosystem as effected by the plants 2 in the container 1.

The irrigation means 5 may be further provided with a pump 55 for boosting water flowing in the irrigation tube 52 towards several perforated tube portions 54 branched from the tube 52 to be drained into the soil 21 or the plants 2 for homogeneously watering the plants 2.

The outlet port 14 may be further connected with an exhaust pipe 15 having an exhaust fan 16 formed on the exhaust pipe 15 for outwardly delivering and distributing the output air, in which the pollutants have been removed by the plants and rich oxygen content has been released from the plants, into plural rooms, floors or offices in the building through a distribution piping system 17 connected to the exhaust pipe 15 as shown in FIG. 2.

If necessary, a dehumidifier (not shown) may be further provided in the distribution piping system 17 to remove any excess moisture content as existing in the output air discharged from the container 1 to obtain an optimum relative humidity for a comfortable living and breathing by the people living in such a building.

The present invention may also be used at night time by properly controlling the illumination timing of the illuminator 3 for performing the photosynthesis process of the plants 2. So, the present invention is not only limited for use at daytime.

The present invention has the following advantages superior to any conventional air cleaning equipment or systems:

1. The plants not only absorbs the air pollutants, but also releasing oxygen to be inhaled by the people or animal, beneficial for their health.
2. Lower installation cost, cheaper operation and maintenance cost can be obtained.
3. The plants can serve as decorative plants for enhancing visual ornamental effect.
4. The carbon dioxide quantity can be decreased to decelerate the global greenhouse effect, thus helpful for establishing a better living environment for human being.

The present invention may be further modified without departing from the spirit and scope of this invention.

I claim:

1. An air-cleaning ecosystem apparatus comprising:
   an ecosystem container formed with a bottom, a roof and at least a side wall and having an ecosystem chamber defined in said container; said container having an inlet port formed in a first side portion of the container; and an outlet port formed in a second side portion of the container opposite to the inlet port;
   a plurality of plants planted in said container;
   at least an illuminator formed in or adjacent to said container;
   an irrigation means including: a water tank secured on or adjacent to said container for delivering water into the container for watering the plants, a plurality of irrigation tubes each said tube having an input end connected with said water tank, and a perforated tube portion led to the plants;
   a primary air treatment means connected to said inlet port of said container for primarily filtering input air and directing the input air into said container, said primary air treatment means including: a blower fixed on an input pipe, a suction filter secured at a front suction end of the blower for filtering particulate pollutants laden in input air as inwardly sucked by the blower, a deodorizing filter formed on the input pipe and having a filter outlet connected with the inlet port of the container for deodorizing the input air as blown by the blower and a control valve formed on the input pipe for controlling a volumetric flow rate of the input air as delivered into the container through the blower and the input pipe; and
   said plurality of plants as planted in the ecosystem container including: at least a green plant absorbing carbon dioxide from the input air entering the container to conduct photosynthesis under light exposure of the illuminator and giving oxygen off into output air, and at least a pollutant-absorbable plant absorbing gaseous pollutants existing in the input air, thereby providing cleaned output air with rich oxygen content to be discharged from the outlet port of the container to be inhaled by human being and animals for an aerobic respiration for completing a gaseous cycle of ecosystem.

2. An air-cleaning ecosystem apparatus according to claim 1, wherein said plants further include at least an aromatic plant for releasing fragrant smell into the air.

3. An air-cleaning ecosystem apparatus according to claim 1, wherein said pollutant-absorbable plant includes: Begonia (*begonia semperflorens*) for absorbing sulfur dioxide and ozone existing in the input air; and water spinach (*ipomaea aquatica*) for absorbing nitrogen dioxide and ozone existing in the input air.

4. An air-cleaning ecosystem apparatus according to claim 1, wherein said suction filter is formed with fibers, non-woven cloth, and air permeable porous foam for filtering particulate pollutants laden in the air.

5. An air-cleaning ecosystem apparatus according to claim 1, wherein said deodorizing filter is formed with activated carbon therein for absorbing and removing stinking smell or odor existing in the input air.

\* \* \* \* \*